July 19, 1966     C. CASEY     3,261,764
THERMOELECTRIC HEATER FOR LIQUID CONCENTRATING STILL
Filed June 17, 1963     3 Sheets-Sheet 1
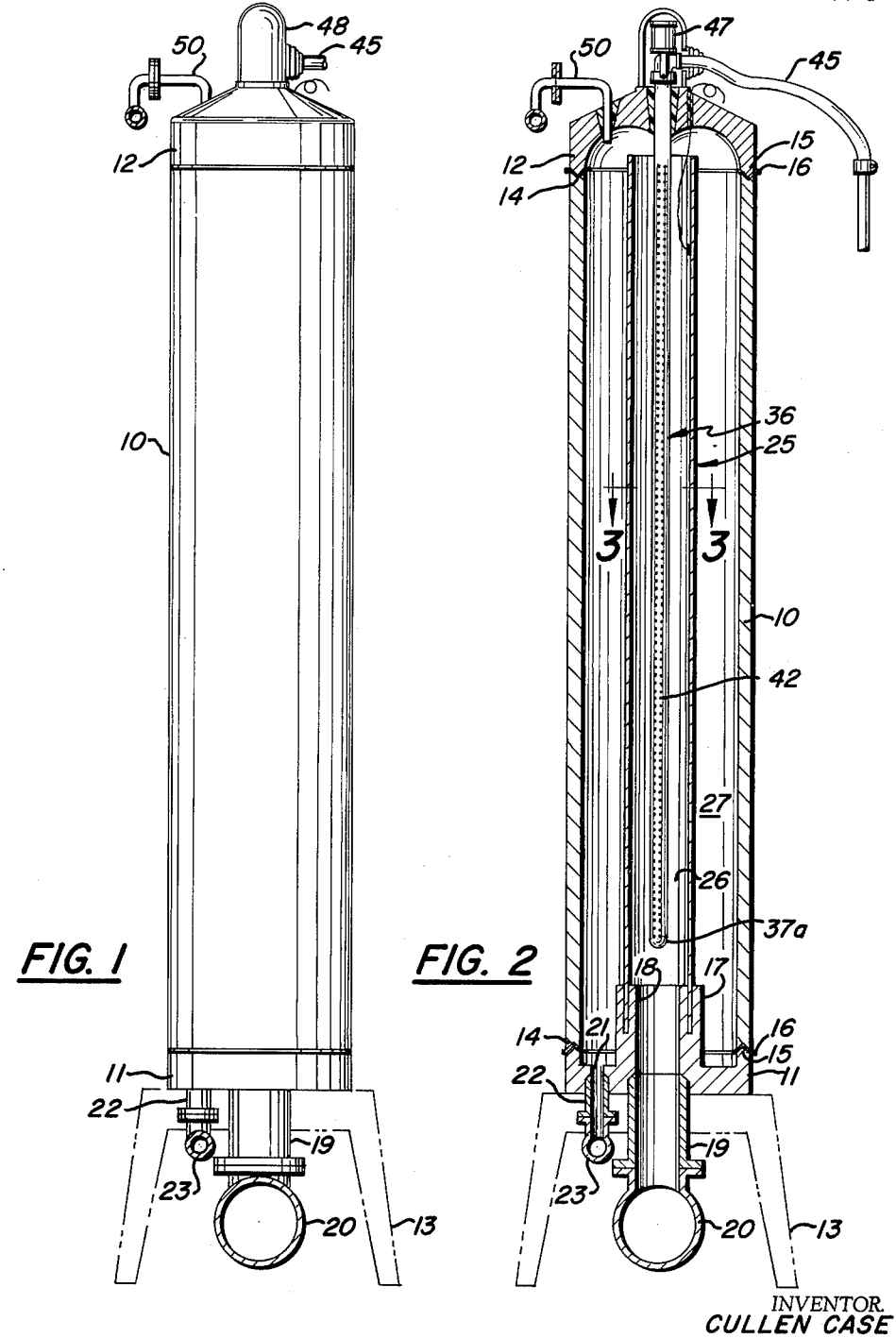
INVENTOR.
CULLEN CASEY
BY MAHONEY, MILLER & RAMBO
ATTORNEYS

INVENTOR.
CULLEN CASEY
BY
MAHONEY, MILLER & RAMBO
BY
ATTORNEYS

United States Patent Office 3,261,764
Patented July 19, 1966

3,261,764
THERMOELECTRIC HEATER FOR LIQUID CONCENTRATING STILL
Cullen Casey, Huntington, W. Va.
(2045 Cranston St., Cranston 9, R.I.)
Filed June 17, 1963, Ser. No. 288,355
2 Claims. (Cl. 202—187)

This invention relates, in general, to distillation apparatus for purification of a liquid. It relates, more specifically, to a novel distillation apparatus for the removal of salt from sea water utilizing a thermoelectric evaporization and condensation element.

Many geographical areas currently inhabited are confronted with the increasingly difficult problem of obtaining or assuring continuation of a sufficient and satisfactory fresh water supply. Natural fresh water resources are continuously diminshing and other means for obtaining fresh water must be devised if entire geographical communities are to continue to exist. As a consequence, there have been attempts to convert sea water, in coastal areas, to potable fresh water suitable for human consumption. To accomplish this, converting apparatus designed primarily for removal of the salt has been developed which operates on either a chemical precipitation principle or distillation. Of the two types, distillation is more effective and most apparatus heretofore developed has been of this type. Distillation apparatus, while effective, has been relatively costly both as to cost of acquisition and cost of operation. Distillation apparatus, as is well known, requires an evaporator and a condenser to perform the separation of mineral impurities from the water necessitating a means for generating heat in the evaporator and absorbing heat in the condenser. A conventional evaporator utilizes a solid or fluid fuel, coal, oil and natural gas, for example, for supplying the necessary heat to a chamber wherein a quantity of raw water is introduced for evaporation. The evaporation leaves the minerals as deposits of solid matter within the evaporating chamber which eventually accumulate to such a degree that the evaporating chamber becomes inefficient. The water vapor is then passed into the condenser where the temperature is lowered by absorption of heat. In conventional condensers, such as the surface type, water at a temperature substantially lower than the vapor is continuously circulated through the condenser to remove the heat and cause the vapor to condense into a liquid. The condenser is a costly device and its operation is costly as power must be supplied by some means to drive the pumps which deliver the cooling water to the condenser. In addition, maintenance costs will also be high in that, in the installations presently under consideration, sea water must also be utilized in the condenser. Minerals carried by the sea water will be deposited on the cooling surfaces of the condenser which will result in a reduction of the efficiency. As a consequence, the conventional surface condensers must be periodically removed from operation to permit cleaning and removal of the mineral deposits.

It is, therefore, the primary object of this invention to provide a distillation apparatus of novel construction having a thermoelectric device supplying the heat necessary for the evaporation cycle and for absorbing heat during the condensation cycle.

It is another important object of this invention to provide a distillation apparatus having a thermoelectric device for evaporating the water and condensing the vapor which is readily reversible in operation to facilitate cleaning of the device for continued high operating efficiency.

It is a further object of this invention to provide a distillation apparatus having a thermoelectric device for operation of the evaporation and condensation cycle which is fabricated as an elongated cylinder with the interior thereof forming an evaporation chamber and provided with a liquid inlet including a double-walled conduit with the walls having a plurality of orifices and which may be relatively positioned to regulate the flow therethrough and to facilitate removal of mineral deposits that may accumulate on the inlet conduit.

It is also an object of this invention to provide a distillation apparatus which may be economically fabricated and operated to process sea water for removal of salt.

These and other objects and advantages of this invention will be readily apparent from the following detailed description and the accompanying drawings.

In the drawings:

FIGURE 1 is an elevational view of the distillation apparatus embodying the principles of this invention.

FIGURE 2 is a vertical, medial sectional view of the apparatus of FIGURE 1.

Figure 3:
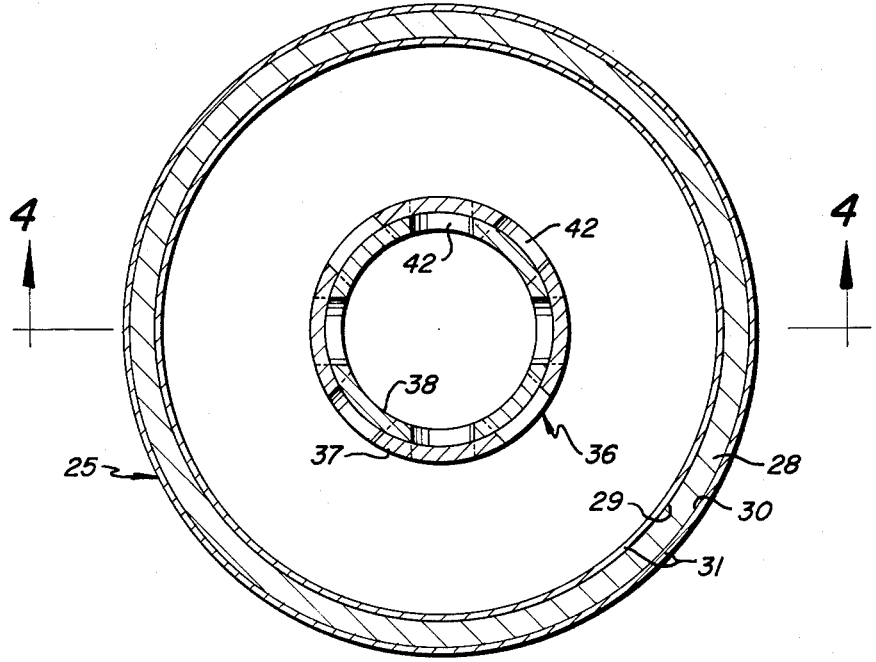
FIGURE 3 is an enlarged, transverse sectional view of the thermoelectric element and liquid inlet conduit taken along line 3—3 of FIGURE 2.

Referring to the drawings, the distillation apparatus includes a housing 10 of elongated, tubular form. In the present embodiment, as illustrated in the drawings, the housing 10 is of cylindrical cross section although other forms may be utilized. Positioned at each end of the housing 10 are the end closing members 11 and 12. The housing 10 may be fabricated from any suitable material having the desired characteristics of structural rigidity. For example, in the present embodiment the housing 10 as well as the end caps 11 and 12 are cast from concrete. The concrete castings also may be provided with reinforcing rods to increase their structural strength. Utilization of materials such as concrete in the fabrication of the housing 10 and its associated end caps 11 and 12 is of particular advantage in distillation apparatus designed for purification of sea water. As is well known, sea water is highly detrimental to materials such as steel producing a rapid rate of corrosion. The housing 10 is designed to be supported on a stand 13 in such a manner that the longitudinal axis thereof will be substantially vertically disposed. To facilitate assembly, the annular edge portions of the housing 10 at each end are formed with a V-shaped groove 14. Each of the grooves 14 are adapted to receive the V-form annular edge 15 of an adjacent end cap 11 or 12. A pliable sealing ring 16 fabricated from material such as neoprene or rubber is disposed between each pair of interlocking V-grooves and V-edges to form a substantially liquid-impervious seal. When mounted and assembled in its normal vertical position, the weight of the housing is sufficient to maintain a substantially liquid-impervious seal between the housing and the lower end cap 11. Similarly, the weight of the upper end cap 12 is sufficient to maintain the V-edge 15 thereof in sealing engagement with the sealing ring 16 and associated V-groove 14.

The lower end cap 11 is provided with an integrally formed coaxial hub 17 of cylindrical form which projects a distance upwardly from the main body of the cap, into the interior of the housing 10. The hub 17 is cast with a central coaxially disposed bore 18 which forms an outlet from the housing. Integrally cast with the end cap 11 is a conduit 19 which forms an outwardly projecting extension of the bore 18. The conduit 19 is formed with a flange at the outer end thereof for connection with conduit 20 forming a waste disposal system. The bore 18 with its associated conduit 19 forms an outlet from the housing 10. Since the conduits 19 and 20 are subjected to the highly corrosive minerals and salts, they are preferably fabricated from corrosion-resistant materials or are at least provided with corrosion-resistant linings.

A second outlet from the housing 10 is provided by a bore 21 formed in the end cap 11 between the hub 17 and the outer edge portion 15. Also integrally cast with the cap 11 is a conduit 22 which forms an extension of the bore 21. The conduit 22 is also provided with a flange at the extreme end thereof for connection with a conduit 23 forming a part of the distillate accumulation system. The conduits 22 and 23 may also be fabricated from corrosion-resistant materials; however, the corrosive minerals and salts have been removed at this point.

Supported within the interior of the housing 10 is a thermoelectric assembly or device 25 which effects the evaporation and condensation cycles of the apparatus. The thermoelectric device 25 is fabricated as an elongated, cylindrical tube which is coaxially disposed within the housing 10. One end of the device 25 is supported by the hub 17 of the lower end cap 11. An annular groove is formed in the hub 17 to receive the marginal end portions of the thermoelectric device 25. If necessary, additional supports may be provided at other locations along the device to assure maintenance of the device in a substantially vertical position. The thermoelectric device 25 extends substantially the length of the housing 10 terminating adjacent the upper end cap 12. The upper marginal end, however, is spaced a distance from the interior surface portions of the upper end cap 12 thereby providing a space for communication between the interior of the thermoelectric device 25 and the remaining portion of the housing 10. As is best shown in FIGURE 2, the thermoelectric device 25 thus divides the interior of the housing into a first chamber consisting of the interior of the device 25 and a second chamber defined by the interior surface of the housing 10 and the exterior surface of the thermoelectric device 25. The first chamber, denoted herein as 26, is substantially separated from the second chamber except at the uppermost portion of the housing 10. Thus, the bores 18 and 21 formed in the lower end cap 11 provide separate outlets, referred to as a first outlet and a second outlet, to the first and second chambers, respectively.

In accordance with this invention, the thermoelectric device 25 is constructed as a relatively thin-walled structure of which the opposite cylindrical surface portions are associated with the hot and cold junctions. The operation of the device 25 is such that by passage of an electric current in a predetermined direction through the electrically connected structural elements thereof will produce simultaneous heat-rejection and heat-absorption at the opposite surface portions of the device. This operation is the well known principle of the thermocouple and the specific structure thereof will only be generally described.

Figure 4:
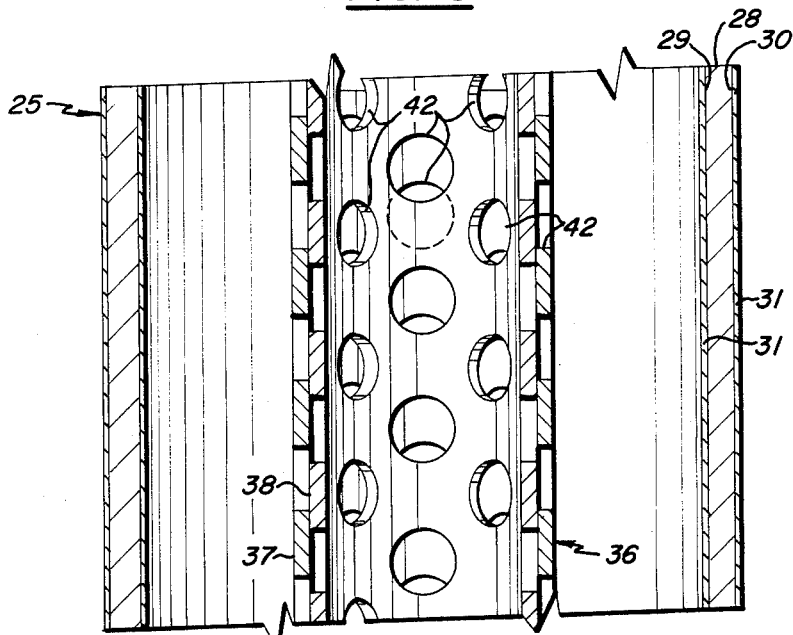
FIGURE 4 is a fragmentary, vertical sectional view taken along line 4—4 of FIGURE 3.
Figure 6:
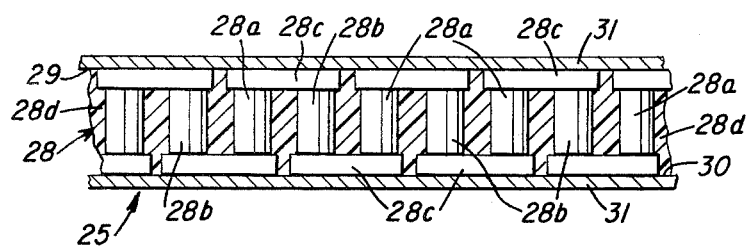
FIGURE 6 is an enlarged, fragmentary sectional view of the thermoelectric element showing details of construction.

Referring to FIGURES 3, 4 and 6, the thermoelectric elements and their associated junctions formed by the alternately disposed elements 28a and 28b and interconnecting, electrically conducting strips 28c are illustrated, generally, by the thin-walled body 28. All of the electrically similar junctions, either heat-rejecting or heat-absorbing, are arranged to form a surface 29 or 30 at either the interior or the exterior, respectively, of the thermoelectric device 25. The elements 28a and 28b, which are formed from dissimilar materials, may be cylindrically shaped and electrically bonded at each end to a respective connecting strip 28c and embedded in an electrical and heat insulating material 28d. It is to be understood that the structure as illustrated in detail in FIGURE 6 would be repeated throughout the thermoelectric device 25 as is well known in the art. Thus, passage of a current through the thermoelectric elements 28 in a predetermined direction will, for example, cause the junctions or terminals associated with the surface 29 to reject heat and the junctions or terminals associated with the surface 30 to absorb heat. In this example, the surface 29 junctions will be referred to as hot junctions and the terminals or junctions associated with the surface 30 will be referred to as cold junctions. A protective coating 31 is bonded to the junction surfaces 29 and 30 to provide the necessary electrical insulation and protection against corrosion from the salt water. The coating 31 is preferably relatively thin to avoid interference with the transmission of heat therethrough and thereby increase the thermal time constant. An electrical cable 32 is connected to the thermoelectric elements 28 and extends through the upper end cap 12 for connection to a suitable power source. The cable 32 is also sealed to the upper end cap 12 by a caulking compound 33 forced into the bore through which the cable 32 extends. The details of the connection of the cable 32 to the thermoelectric elements 28 is not illustrated or described as the technique is well known to those skilled in the art.

Figure 5:
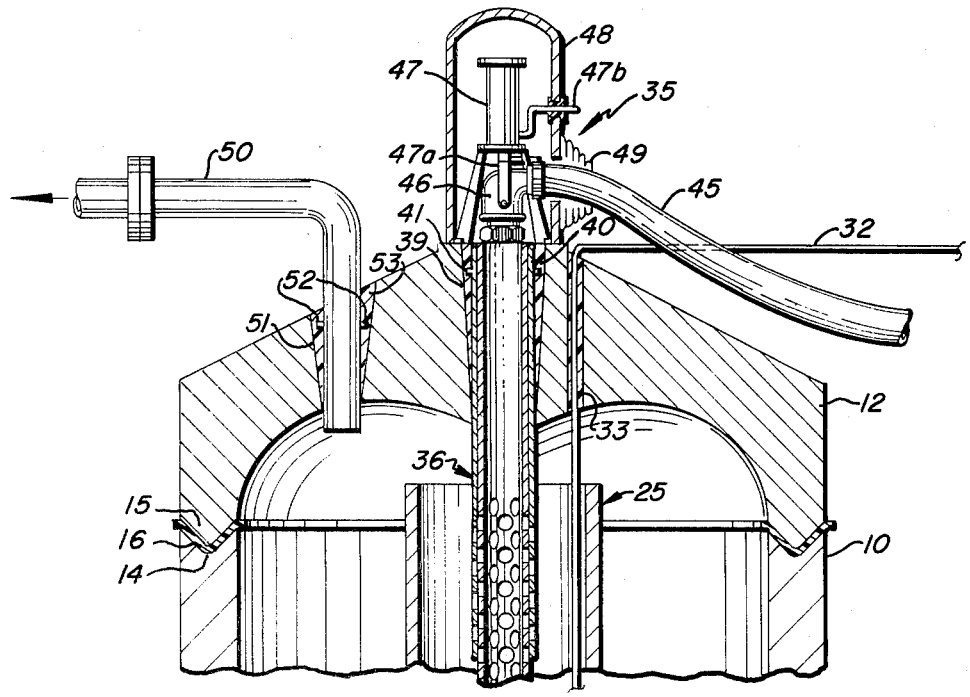
FIGURE 5 is an enlarged, fragmentary vertical sectional view of the upper cap member of the apparatus.

A liquid inlet, denoted generally by the numeral 35, is provided in the upper end cap 12 for directing a substantially continuous flow of raw or undistilled sea water interiorly of the housing 10. The inlet 35 includes a double-walled conduit 36, as is best shown in FIGURES 3 and 4, having a pair of coaxially disposed cylindrical tubes 37 and 38 which are of such a diameter that the adjacent surface portions thereof will be in contacting engagement. The outer tube 37 is rigidly suspended from the upper end cap 12 while the internal tube 38 is free to move longitudinally thereof. As clearly shown in FIGURE 5, the outer tube 37 extends substantially through the upper end cap 12 and is disposed in a tapered plug bore 39. A grouting material 40 is poured into the plug bore 39 in surrounding relationship to the tube 37 to maintain the conduit 36 in fixed position relative to the upper end cap 12. A pair of lugs 41 are also secured to the upper end portion of the tube 37 disposed within the bore 39 to further assure maintenance of the conduit 36 in its proper position. By utilizing a grouting material which is relatively soft in comparison with the concrete cap, the inlet conduit may be readily removed for replacement without resulting in destruction to the cap itself. The bore 39 is disposed at the center of the cap 12 to support the conduit 36 in coaxial relationship with the thermoelectric device 25. The conduit 36 extends downwardly from the cap 12 a distance substantially equal to the length of the thermoelectric device 25 and terminates adjacent the upper end of the hub 17. Each of the tubes 37 and 38 is formed with a plurality of apertures 42. The apertures 42 are formed in each of the tube 37 and 38 in such a manner that at a particular relative positioning of the tubes 37 and 38 the apertures 42 will be aligned. On moving the interior tube 38 relative to the tube 37 the apertures 42 will become aligned as indicated in FIGURE 4 providing relatively small apertures or openings through which the undistilled liquid or raw sea water may flow. The lower end of the exterior tube 37 is closed by a cap 37a to prevent the outflow of water therefrom.

Attached to the upper end of the tube 38 which extends exteriorly of the upper cap 12, is a flexible hose or conduit 45. The hose 45 is connected to the tube 38 by an elbow coupling 46 with the elbow, hose and tube being supported on the cap 12 by a positioning device 47 mechanically connected to the elbow. The positioning device 47 has a movable armature or piston rod 47a which may be selectively positioned in either an upper or lower position. In the illustrated embodiment, the positioning device 47 consists of an air cylinder connected to a suitable control system by a pressure line 47b although it is to be understood that an electrical solenoid may be readily substituted therefor. The air cylinder 47 and coupling 46 with the associated portion of the hose 45 are protected by an enclosure 48. A flexible weather seal 49 is provided at an opening in the enclosure 48 through which the hose 45 extends. The tubes 37 and 38 are normally positioned by the air cylinder 47 as indicated in FIGURE 4 with the apertures 42 slightly overlapping to form an effective opening of crescent shape. The relative positions of the tubes 37 and 38 will determine the size of the opening through which the liquid will be forced. By appropriately positioning the tubes 37 and 38, a desired spray may be formed which will be evenly distributed throughout the evaporation chamber for effective operation.

The evaporation cycle may be completed at a temperature substantially lower than that normally required by reducing the pressure within the housing. If desired, the reduction could be to such an extent that the pressure would be below normal atmospheric pressure at the installation. A reduction in pressure may be readily accomplished through utilization of the well known air ejector apparatus or by conventional vacuum pumps and such apparatus is therefore not illustrated or further described. The connection of the apparatus to the interior chambers is made through the upper cap 12 by a conduit 50. The conduit 50 extends through an aperture 51 of conical shape formed in the cap 12 and communicates interiorly of the housing 10. To aid in rigidly positioning the conduit 50 in aperture 51, a pair of anchor lugs 52 are attached to the surface of the conduit normally disposed within the aperture. A quantity of grouting material 53 is poured into the aperture 51 in surrounding relationship to the conduit 50 and thus forms a vapor-proof seal therewith but rigidly retains the conduit in its proper position when solidified. The grouting 53 is preferably a softer material than the concrete from which the cap 12 is fabricated and may therefore be readily removed damage to the cap should it be necessary to replace the conduit 50.

The normal operation of the apparatus, after initial installation and connection to the necessary auxiliary components, consists of causing a stream of sea water to flow through the inlet conduit into the housing where the water is first subjected to an evaporation cycle and the resultant vapors subsequently subjected to a condensation cycle. The evaporation cycle occurs within the first chamber 26 while the condensation cycle occurs within the second chamber. To effect the evaporation and condensation of the water and resultant vapors, an electric current is caused to flow through the thermoelectric device in a predetermined direction to cause a rejection of heat by the junctions at the surface 29 associated with the first chamber 26 and a simultaneous absorption of heat at the surface 30 associated with the second chamber 27.

The raw sea water enters the first chamber 26 through the coaxial tubes 37 and 38 by means of the cooperative apertures formed in the walls thereof. By adjusting the relative positions of the tubes, the effective size of the apertures may be increased or decreased to vary the volume of water flowing into the first chamber 26 and the fineness of the spray. Adjustment of the relative position of the tubes for this purpose is accomplished through positioning of the air cylinder 47 and its associated piston to locate the inner tube 38 at a desired reference position in relation to the external tube 37. Water entering the apparatus will thus be discharged in a fine spray through the apertures into the first chamber 26 for evaporation.

The raw sea water contains other minerals in addition to salt and these minerals will be deposited on the peripheral edges and surface portions of the apertures of the tubes 37 and 38. The mineral deposits will eventually accumulate after prolonged use to such an extent that the water flow will be seriously impeded resulting in a reduction in the efficiency of operation. This problem is alleviated by the novel construction of the inlet conduit 36 which permits periodic removal of the accumulated deposits without disassembly of the apparatus for access to the conduit. At periodic intervals, the positioning device 47 is actuated causing movement of the internal tube 38. The mineral deposits formed as scale are relatively brittle and will be shattered by movement of the tube and thereby dislodged from the tubes. By maintaining a constant inflow of water, the scale particles will be carried into the first chamber 26 where they are collected and removed. Their removal is by means of the first outlet comprising the bore 18 and the conduits 19 and 20. As will be more fully explained hereinafter, the evaporation cycle is discontinued during the scale removing process and the water utilized in flushing will also be removed from the chamber 26.

During the scale removing operation, the direction of current flow through the thermoelectric device 25 is also reversed which will reverse the heat rejection and heat absorption at the surfaces 29 and 30. Thus, heat will now be absorbed at the surface 29 producing a relative cooling effect. The various minerals present in the water are also deposited on the surface 29 of the thermoelectric element in the form of scale during the evaporation cycle in a manner similar to the scale formation on the inlet conduit 36. The relative cooling effect produced at the surface 29 will cause the scale formed thereon to contract and, as a consequence of the brittleness thereof, shatter the scale deposit. Shattering of the scale deposits results in their removal from the surface 29 and subsequent removal from the chamber 26 thorugh the first outlet. Simultaneously, rejection of heat at the surface 30 will produce a relative heating at this surface resulting in evaporation of any liquid that may have accumulated. Also, during the condensation cycle, frost may be formed on this surface which substantially affects the rate of heat transfer.

It is readily apparent that the distillation apparatus of this invention is capable of efficiently removing the minerals from sea water and providing a potable water. The thermoelectric device as constructed in accordance with this invention is of particular advantage in evaporating and condensing the water and resultant vapor. Minerals deposited as a scale on the various components may be conveniently removed without disassembly of the apparatus.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. A liquid distillation apparatus comprising a closed housing formed with first and second communicable chambers, liquid inlet means communicating with said first chamber including a pair of coaxially disposed, relatively axially displaceable tubular members having the adjacent surfaces thereof arranged in sliding, contacting engagement, each of said tubular members being formed with a multiplicity of apertures which are relatively arranged to be aligned at a first relative position of said tubular members permitting the flow of liquid therethrough and to be misaligned at a second relative position of said tubular members substantially preventing the flow of liquid therethrough, first outlet means communicating with said first chamber, second outlet means communicating with the second of said chambers, a thermoelectric assembly having a first set of terminals arranged in heat-exchanging relationship with said first chamber and a second set of terminals arranged in heat exchanging relationship with said second chamber, and means for energizing said thermoelectric assembly by causing an electric current to flow through said first and second sets of terminals in a predetermined direction whereby heat will be rejected by one set of said terminals and heat will be absorbed by the other set of said terminals.

2. A liquid distillation apparatus according to claim 1 which includes means connected to said liquid inlet tubular members operable to effect relative axial displacement thereof.

References Cited by the Examiner

UNITED STATES PATENTS

| | | | |
|---|---|---|---|
| 640,547 | 1/1900 | Duffie | 239—541 |
| 2,779,172 | 1/1957 | Lindenblad | 62—90 X |
| 2,844,638 | 1/1958 | Lindenblad | 202—187 X |
| 2,971,897 | 2/1961 | Chapman. | |
| 2,993,842 | 7/1961 | Smith | 202—236 |

FOREIGN PATENTS 855,458  11/1960  Great Britain.

NORMAN YUDKOFF, *Primary Examiner.*

F. E. DRUMMOND, *Assistant Examiner.*